(12) United States Patent
Thomas

(10) Patent No.: US 8,840,405 B2
(45) Date of Patent: Sep. 23, 2014

(54) AIRCRAFT GPU CONNECTION METHOD AND APPARATUS

(75) Inventor: Larry Thomas, Clermont, FL (US)

(73) Assignee: John Bean Technologies Corporation, Chicago, IL (US)

( * ) Notice: Subject to any disclaimer, the term of this patent is extended or adjusted under 35 U.S.C. 154(b) by 531 days.

(21) Appl. No.: 13/136,642

(22) Filed: Aug. 5, 2011

(65) Prior Publication Data

US 2012/0045906 A1 Feb. 23, 2012

Related U.S. Application Data

(60) Provisional application No. 61/401,321, filed on Aug. 11, 2011.

(51) Int. Cl.
*H01R 33/00* (2006.01)
*B64F 1/22* (2006.01)

(52) U.S. Cl.
CPC .................................... *B64F 1/227* (2013.01)
USPC .............................. 439/35; 439/638; 439/502

(58) Field of Classification Search
USPC ..................... 439/35, 638, 502, 503
See application file for complete search history.

(56) References Cited

U.S. PATENT DOCUMENTS

| 2,409,552 | A | * | 10/1946 | Donnellan | 244/63 |
| 4,971,576 | A | * | 11/1990 | Thimmesch | 439/502 |
| 6,283,696 | B1 | | 9/2001 | Trummer et al. | |
| 7,195,267 | B1 | * | 3/2007 | Thompson | 280/477 |
| 7,484,689 | B2 | * | 2/2009 | Musial et al. | 244/114 R |
| 7,591,673 | B2 | * | 9/2009 | Chan et al. | 439/502 |
| 7,682,198 | B1 | * | 3/2010 | Plattner | 439/638 |
| 8,113,866 | B2 | * | 2/2012 | Gosis et al. | 439/365 |
| 2003/0032336 | A1 | * | 2/2003 | Lazaro et al. | 439/680 |
| 2004/0011918 | A1 | * | 1/2004 | Musial et al. | 244/1 R |
| 2010/0197159 | A1 | * | 8/2010 | Gosis et al. | 439/370 |
| 2012/0309214 | A1 | * | 12/2012 | Beluse | 439/180 |

* cited by examiner

*Primary Examiner* — Briggitte R Hammond
(74) *Attorney, Agent, or Firm* — Christensen O'Connor Johnson Kindness PLLC

(57) ABSTRACT

A GPU connection apparatus for an aircraft towing vehicle comprising a vehicle-mounted ground power unit (GPU). The GPU includes a GPU cable having a first end which is connected to the GPU and a second end which includes a GPU connector that is configured to be plugged into a GPU receptacle on an aircraft to be towed. The GPU connection apparatus includes an intermediate cable having a first end which comprises a cable plug and a second end which comprises a cable receptacle. The cable plug is configured to be plugged into the GPU receptacle. In addition, the cable receptacle is configured to receive the GPU connector. In use of the GPU connection apparatus, the cable plug is plugged into the GPU receptacle and the GPU connector is plugged into the cable receptacle to thereby electrically connect the aircraft to the GPU.

18 Claims, 10 Drawing Sheets

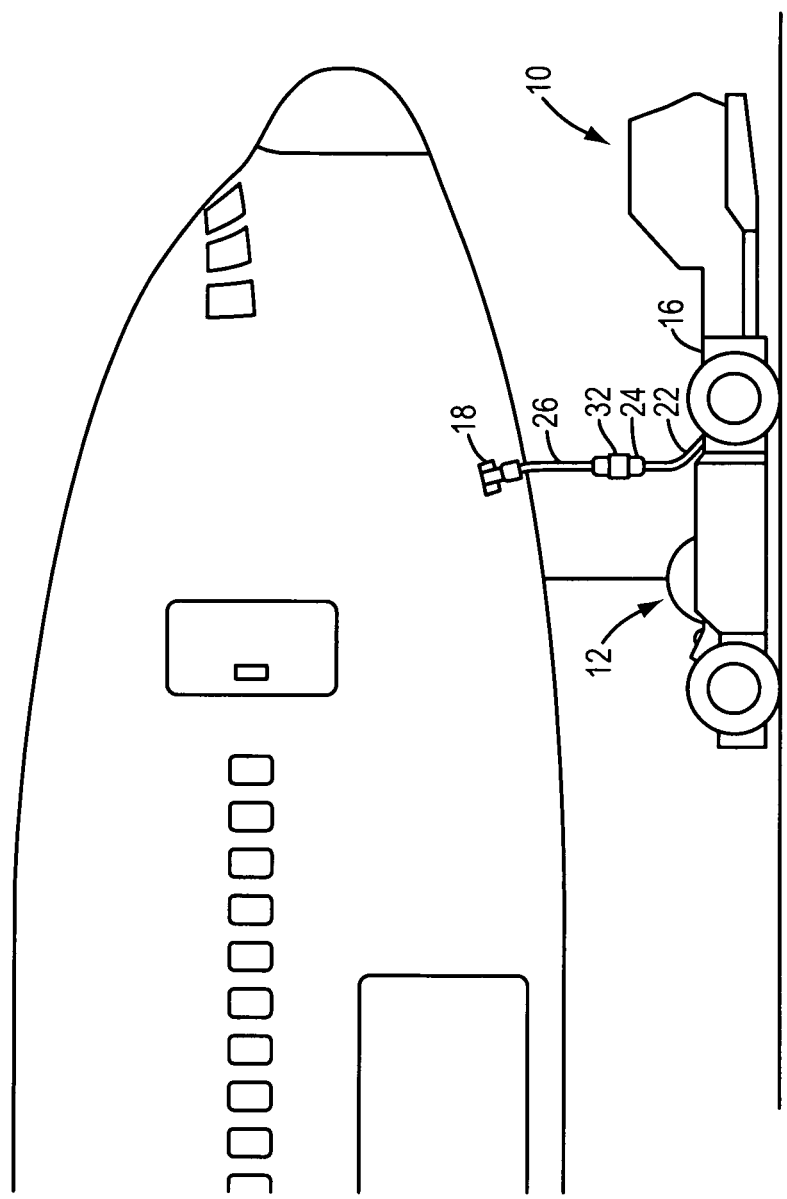

AIRCRAFT GPU CONNECTION METHOD AND APPARATUS

This application is based on and claims the benefit of U.S. Provisional Patent Application No. 61/401,321 filed on Aug. 8, 2011.

BACKGROUND OF THE INVENTION

The present invention relates to a method and apparatus for connecting a ground power unit (GPU) to an aircraft. More particularly, the invention relates to a method and apparatus for connecting a towbarless tractor-mounted GPU to the aircraft using an intermediate cable and/or towbarless tractor which is configured to prevent the cable from being damaged by the wheels or clamping mechanism of the tractor as it is approaching and clamping onto the aircraft's nose landing gear.

GPU's are used to provide temporary power to an aircraft as it is parked, e.g., at an airport terminal gate. Prior art GPU's are typically stationary devices which are positioned, among other locations, adjacent the gate. Thus, when the aircraft is being towed from the gate to, e.g., a hangar, it must be disconnected from the GPU. As the aircraft is being towed, power for the aircraft is provided by the aircraft's auxiliary power unit (APU). However, APU's are relatively inefficient devices which consume a significant amount of fuel.

Towbarless tractors are used to tow aircraft. These tractors commonly comprise a horizontal U shaped frame which contains a clamping mechanism. The clamping mechanism clamps onto and lifts the aircraft's nose landing gear prior to towing. Thus, during the clamping operation the tractor is positioned so that the frame surrounds the front and both sides of the nose landing gear.

A towbarless tractor has been developed which includes an on-board GPU. Thus, the aircraft can be connected to the tractor-mounted GPU to provide power to the aircraft during the tow, which obviates the need to use the aircraft's inefficient APU.

To use the tractor-mounted GPU, an operator needs to connect the GPU cable to the aircraft's GPU receptacle. The GPU cable is a heavy electric cable which includes a connector on its free end that is configured to be inserted into the GPU receptacle. The GPU cable and connector are relatively heavy and require considerable force to be properly inserted into the receptacle.

The location of the GPU receptacle varies by type of aircraft, but is generally in the vicinity of the nose landing gear. Thus, to connect the GPU cable to the aircraft during or after the clamping operation, the operator often must climb onto the tractor and in some cases even step onto the clamping mechanism. Moreover, in the case of a tall aircraft the operator may have to stretch to reach the GPU receptacle, and in the case of a low aircraft the operator may have to crouch between the tractor and the aircraft fuselage to reach the GPU receptacle. In many cases climbing onto the tractor while handling the heavy GPU cable presents a fall hazard.

An alternative to climbing on the tractor to connect the GPU cable to the GPU receptacle is to stop the tractor short of the nose landing gear and connect the cable to the receptacle prior to the clamping operation. To do this the GPU cable has to be sufficiently long. However, a risk exists that such a long GPU cable may be run over or pinched or clamped by the clamping mechanism as the tractor approaches the nose landing gear. To avoid this risk a second operator must often be used to guide the cable; but this puts the operator at risk of being hit by the tractor or pinched by the clamping mechanism as the tractor approaches the nose landing gear.

SUMMARY OF THE INVENTION

The present invention provides a method and apparatus for efficiently and safely connecting the tractor-mounted GPU to the aircraft's GPU receptacle. In one embodiment of the invention, the process of connecting the GPU cable to the aircraft's GPU receptacle is broken down into two steps. The first step involves connecting a relatively short intermediate cable to the GPU receptacle prior to the clamping operation. The second step involves connecting the tractor's GPU cable to the intermediate cable after the clamping operation.

In this embodiment of the invention, the intermediate cable comprises a short section of GPU-type cable which includes a plug on one end and a receptacle on the other end. The plug is configured the same as the connector on the tractor's GPU cable, and the receptacle is configured to receive the connector on the GPU cable. In addition, several different intermediate cables having different lengths may be provided to suit a variety of aircraft having different receptacle locations.

The present invention provides many advantages over the prior art. Since the intermediate cable is relatively short, it is lighter than a conventional GPU cable and therefore easier to lift and connect to the GPU receptacle. In addition, since the intermediate cable is not connected to the tractor-mounted GPU unit, it is easier to handle. Furthermore, once the intermediate cable is connected to the aircraft's GPU receptacle, the receptacle end of the intermediate cable hangs free at a height above ground level that is sufficient to prevent the cable from being run over or pinched during the clamping operation. (On most towbarless tractors a height of approximately 4 to 5 feet above ground level is sufficient.) Moreover, the receptacle end of the intermediate cable is easily reachable by the operator after the clamping operation, thus eliminating the need to climb onto the tractor to reach the intermediate cable.

These and other objects and advantages of the present invention will be made apparent from the following detailed description, with reference to the accompanying drawings. In the drawings, the same reference numbers may be used to denote similar components in the various embodiments.

BRIEF DESCRIPTION OF THE DRAWINGS

FIG. 5 is a side elevation view similar to FIG. 4, but showing the intermediate cable plugged into the GPU cable on the towbarless tractor;

DETAILED DESCRIPTION OF THE INVENTION

A method and apparatus for connecting a towbarless tractor-mounted GPU to an aircraft's GPU receptacle in accordance with one embodiment of the present invention will now be described with reference to FIGS. 1-5.

Figure 1:
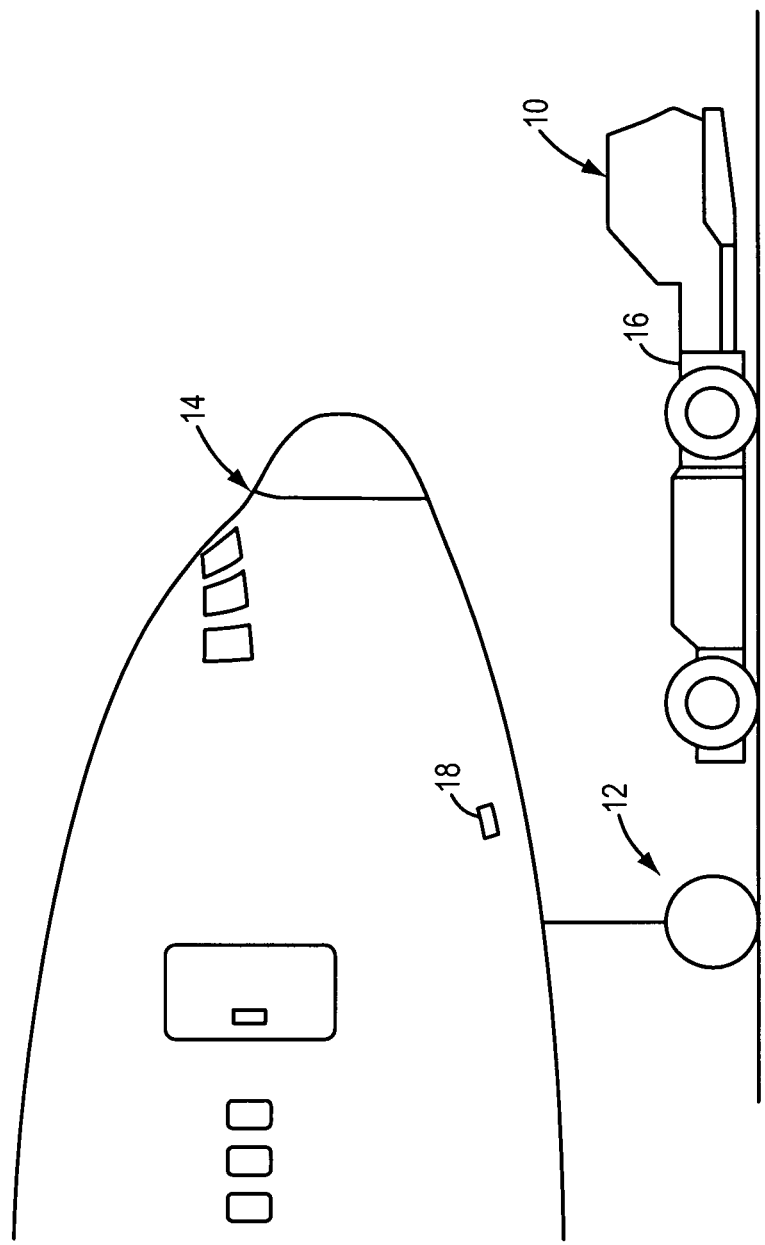
FIG. 1 is a side elevation view of an exemplary towbarless tractor approaching the nose landing gear of an aircraft.

Referring to FIG. 1, a towbarless tractor 10 is shown approaching the nose landing gear 12 of an aircraft 14 in preparation for a clamping and towing operation. The tractor 10 comprises a GPU 16 and the aircraft 14 includes a conventional GPU receptacle 18 to which the GPU is connected when temporary power to the aircraft 14 is required, for example during the towing operation. As shown most clearly in FIG. 4, the tractor 10 also includes a known clamping mechanism 20 and the GPU 16 includes a conventional GPU cable 22 which comprises a GPU connector 24 on its free end that is configured to plug into the GPU receptacle 18.

Figure 2:
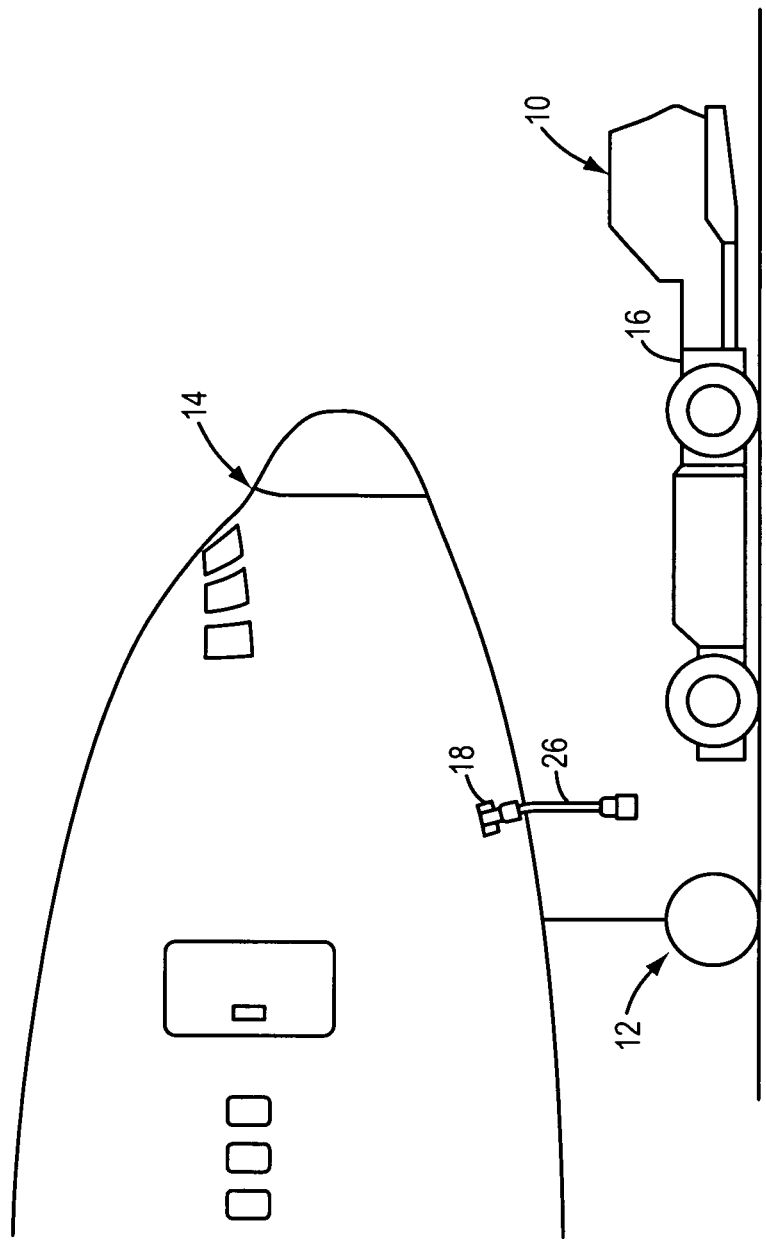
FIG. 2 is a side elevation view similar to FIG. 1, but showing an intermediate cable in accordance with one embodiment of the present invention plugged into the GPU receptacle on the aircraft.
Figure 3:
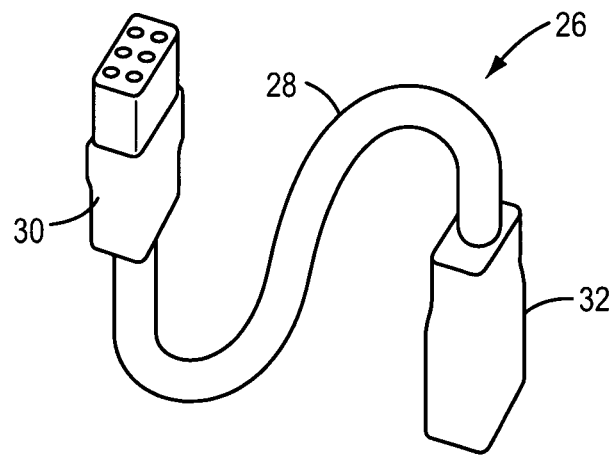
FIG. 3 is a perspective view of the intermediate cable shown in FIG. 2.

As shown in FIG. 2, prior to the clamping operation the tractor 10 is stopped short of the nose landing gear 12 and an intermediate cable 26 is connected to the GPU receptacle 18. As shown in FIG. 3, the intermediate cable 26 comprises a relatively short length of GPU-type cable 28 which includes a cable plug 30 on one end and a cable receptacle 32 on the other end. The cable plug 30 is configured similar to the GPU connector 24 (i.e., to be plugged into the GPU receptacle 18), and the cable receptacle 32 is configured to receive the GPU connector.

Referring again to FIG. 4, after the intermediate cable 26 is connected to the aircraft's GPU receptacle 18, the tractor 10 is backed up to the nose landing gear 12 and the clamping mechanism 20 is activated to clamp and slightly lift the nose landing gear 12. In this position, the tractor 10 surrounds the front and both sides of the landing gear 12.

As shown in FIG. 5, after the tractor 10 clamps the nose landing gear 12, the GPU cable 22 is connected to the intermediate cable 26. This is accomplished by plugging the connector 24 of the GPU cable 22 into the receptacle 32 of the intermediate cable 26. The aircraft is now connected to the GPU 16 and the towing operation may proceed.

Thus, the present invention comprises two steps for connecting the GPU 16 to the aircraft's GPU receptacle 18. In the first step the intermediate cable 26 is connected to the GPU receptacle 18 prior to the tractor 10 surrounding and clamping the nose landing gear 12. In this position of the tractor 10 the GPU receptacle 18 is readily accessible. As a result, an operator is not required to climb onto the tractor 10 or the clamping mechanism 20 in order to gain access to the GPU receptacle 18.

Figure 4:
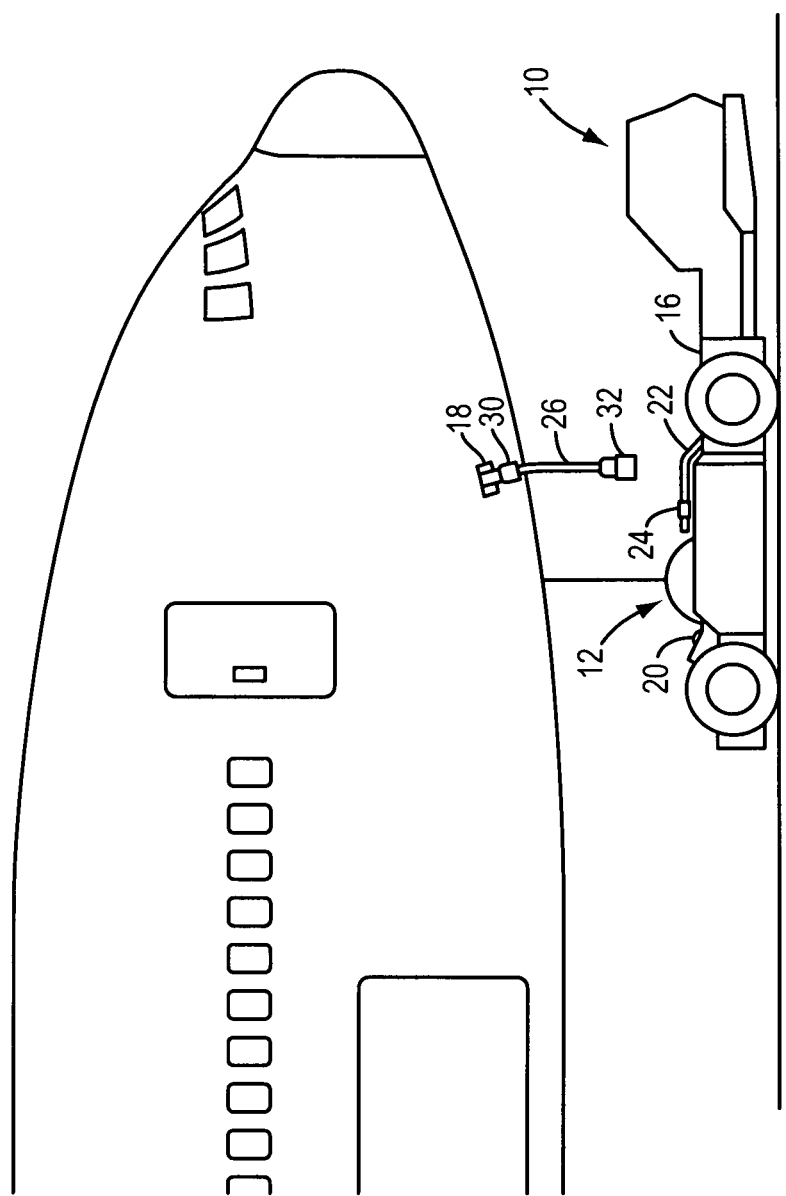
FIG. 4 is a side elevation view similar to FIG. 2, but showing the towbarless tractor having engaged the nose landing gear of the aircraft.

In the second step the GPU cable 22 is connected to the intermediate cable 26 after the tractor 10 has clamped the nose landing gear 12. As shown in FIG. 4, the intermediate cable is of a length sufficient to maintain the receptacle 32 above the tractor 10 as the tractor approaches and clamps the nose landing gear 12. Thus, no risk exists that the intermediate cable 26 will be run over by the tractor 10 or pinched or clamped by the clamping mechanism 20. Also, after the tractor 10 has clamped the nose landing gear 12, the receptacle 32 of the intermediate cable 26 is easily reachable, which allows the operator to connect the GPU cable 22 to the intermediate cable without having to climb onto the tractor 10.

In the event the aircraft's GPU receptacle 18 is located a considerable distance above the ground, the present invention may include means to facilitate the connection of the intermediate cable 26 to the GPU receptacle without the need for a ladder or the like.

Figure 6:
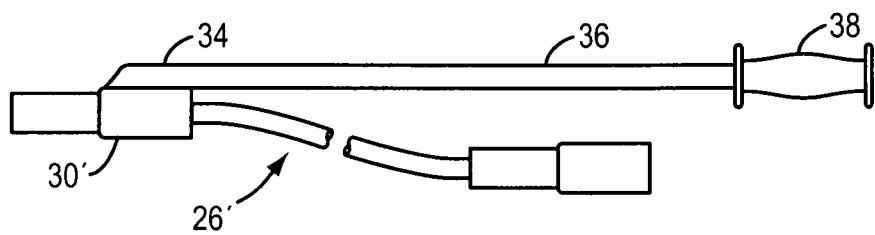
FIG. 6 is a side elevation view of a second embodiment of the intermediate cable of the present invention in which one embodiment of an extension pole of the invention is shown attached to the plug end of the intermediate cable.

Referring to FIG. 6, a first embodiment of an intermediate cable is shown which includes such means. In this embodiment of the invention, the intermediate cable 26' includes a plug 30' which is connected to a first end 34 of an extension pole 36, the opposite end of which may be provided with a handle 38. The extension pole 36 is of sufficient length to allow the operator to insert the plug 30' into the GPU receptacle 18 while standing on the ground. After the plug 30' is connected to the GPU receptacle 18, the extension pole 36 remains connected to the intermediate cable 26' to facilitate the unplugging of the intermediate cable from the GPU receptacle when power from the GPU 16 is no longer needed.

Figure 7:
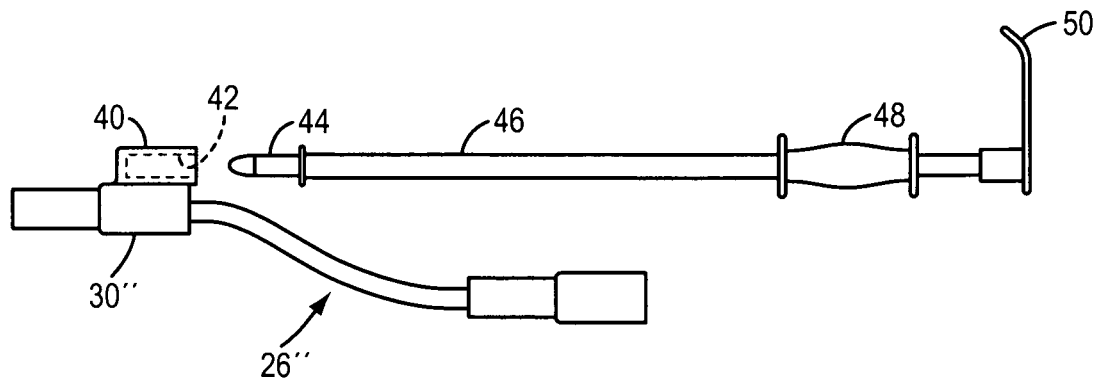
FIG. 7 is a side elevation view of a third embodiment of the intermediate cable of the present invention in which another embodiment of an extension pole of the invention is shown which is detachably connectable to the plug end of the intermediate cable.

Referring to FIG. 7, a second embodiment of an intermediate cable is shown which includes means to facilitate the connection of the intermediate cable to a GPU receptacle 18 which is located a considerable distance above the ground. In this embodiment of the invention, the intermediate cable 26" includes a plug 30" to which a socket 40 is attached. The socket 40 includes an aperture 42 which is configured to receive an end 44 of an extension pole 46, the opposite end of which may be provided with a handle 48. As shown in FIG. 7, the handle end of the extension pole 46 may also include a hook 50 which the operator may use to guide the intermediate cable 26" away from the tractor 10 as the tractor is positioned around the nose landing gear 12. Similar to the extension pole 36, the extension pole 46 is of sufficient length to allow the operator to insert the plug 30" into the GPU receptacle 18 while standing on the ground. In this embodiment of the invention, after the intermediate cable 26" is connected to the GPU receptacle 18, the extension pole 46 may be removed from the plug 30".

In accordance with another embodiment of the present invention, means may be provided for effectively limiting the length of the intermediate cable 26 while allowing the intermediate cable to be manually extended to its full length. Such means may be desirable when the intermediate cable must be sufficiently short to clear the tractor 10 but also sufficiently long to reach the GPU cable 22.

Figure 8:
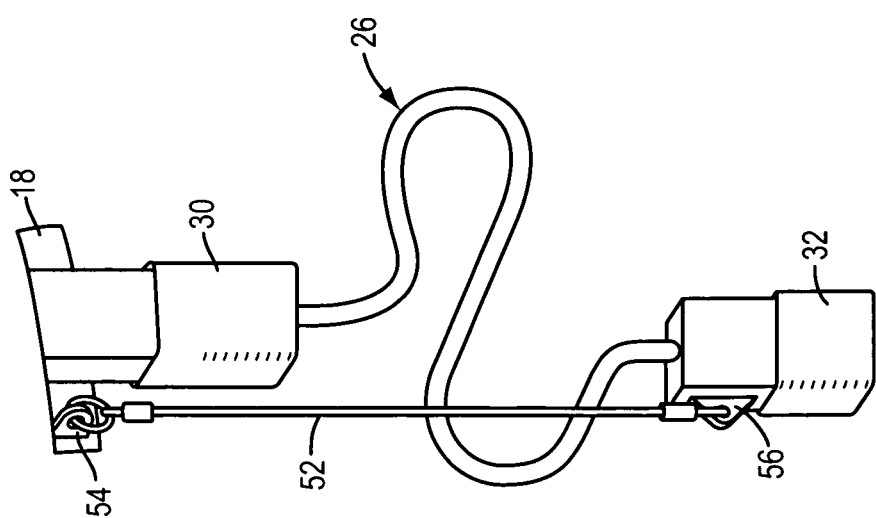
FIG. 8 is a perspective view of an embodiment of the present invention which includes an elastic cord to limit the length of the intermediate cable yet still allow the intermediate cable to be manually extended to its full length.

Referring to FIG. 8, one means for effectively limiting the length of the intermediate cable 26 is shown to comprise an elastic cord 52, such as a bungee cord. The elastic cord 52 includes a first end which is connected to a first bracket 54 that is attached to the GPU receptacle 18 and a second end which is connected to a second bracket 56 that is attached to the receptacle 32 of the intermediate cable 26. The elastic cord 52 has a length and elasticity such that in its relaxed state it maintains the receptacle 32 a sufficient distance above the ground but allows the receptacle to be extended so that the intermediate cable 26 may be connected to the GPU cable 22.

Figure 9:
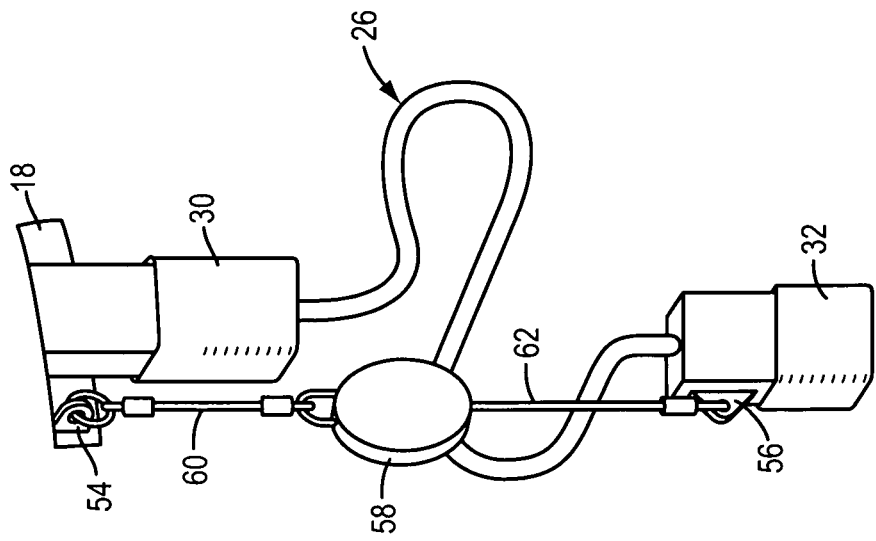
FIG. 9 is a perspective view of an embodiment of the present invention which includes spring-wound retractable cable reel to limit the length of the intermediate cable yet still allow the intermediate cable to be manually extended to its full length.

Referring to FIG. 9, another means for effectively limiting the length of the intermediate cable 26 is shown to comprise a spring-wound retractable cable reel 58. The reel 58 is connected to the first bracket 54 by a short cable 60 and includes a retractable cable 62 which is connected to the second bracket 56. The reel 58 thus functions to maintain the receptacle 32 a sufficient distance above the ground but allow the receptacle to be extended so that the intermediate cable 26 may be connected to the GPU cable 22.

In accordance with another embodiment of the present invention, the effective length of the GPU cable 22 is maintained sufficiently small in order to ensure that the cable is not run over or pinched as the tractor 10 approaches the nose landing gear 12 in preparation for the clamping operation.

Figure 10:
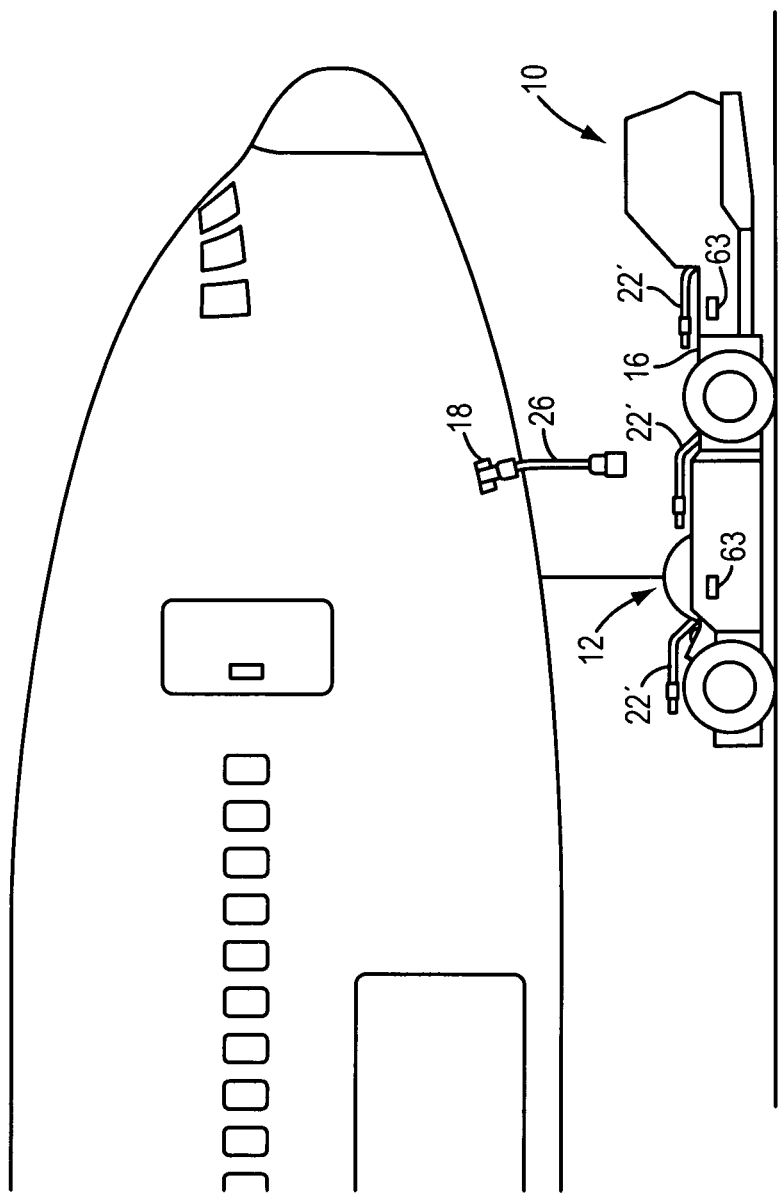
FIG. 10 is a side elevation view of an embodiment of the present invention in which a towbarless tractor is provided with a plurality of GPU cables into which the intermediate cable may be plugged.

Referring to FIG. 10, in one embodiment of the present invention this objective is achieved by providing the tractor 10 with a number of relatively short GPU cables 22' which are positioned along the length of the tractor 10. Each GPU cable 22' may be individually connected to the GPU 16 or connected to a trunk cable (not shown) which in turn is connected to the GPU. In addition, the GPU cables 22' may have the same length or different lengths. In operation, after the tractor 10 clamps onto the nose landing gear 12, the intermediate cable 26 is connected to the most conveniently located GPU cable 22. The GPU cables 22' thus facilitate the connection of a desirably short intermediate cable 26 to the GPU 16 without the need for a long GPU cable 22.

Alternatively or in addition to a plurality of GPU cables 22', the tractor 10 may comprise a plurality of GPU connectors 63 onto which the intermediate cable 26 may be plugged. This embodiment is particularly suitable for relatively tall tractors 10. In operation, after the tractor 10 clamps onto the nose landing gear 12, the intermediate cable 26 may be plugged into the most conveniently located GPU receptacle 63.

Figure 11:
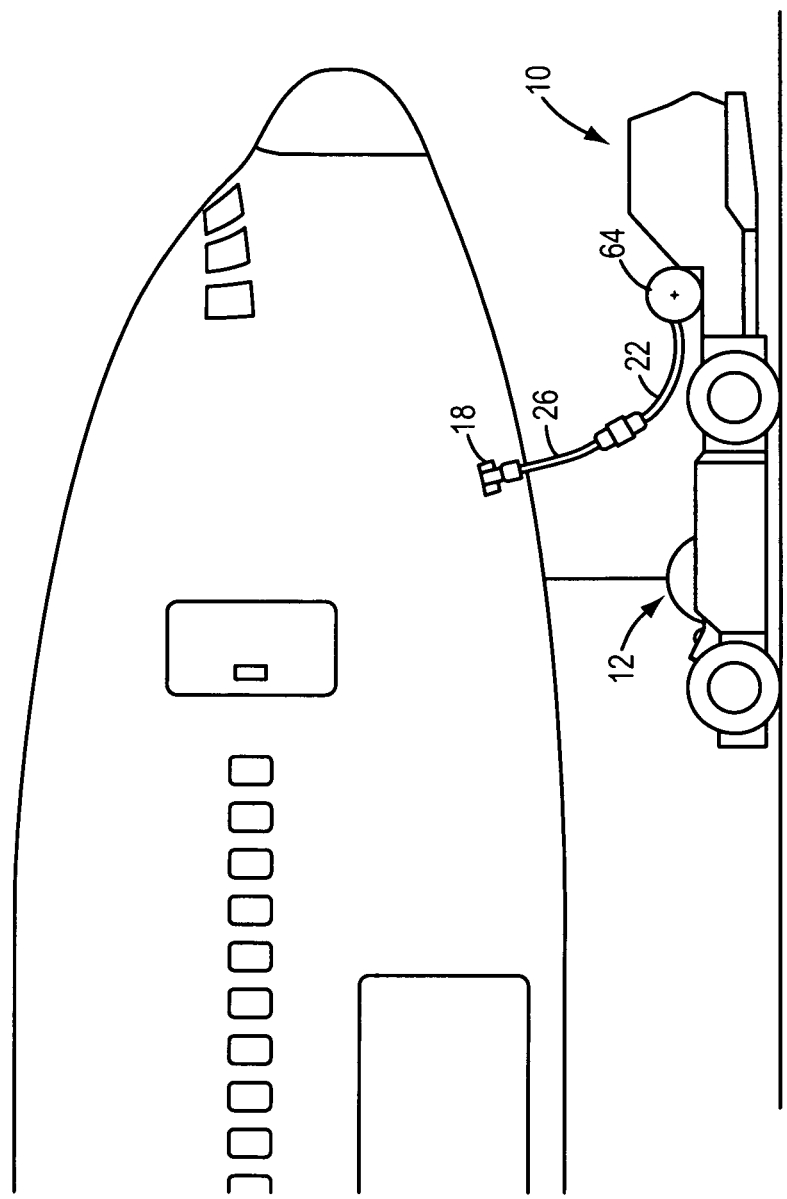
FIG. 11 is a side elevation view of an embodiment of the present invention in which a towbarless tractor is provided with a spring-wound retractable cable reel on which the GPU cable is wound.

In accordance with another embodiment of the invention which is shown in FIG. 11, the effective length of the GPU cable 22 is maintained sufficiently small by winding the GPU cable on a retractable cable reel 64. The reel 64 is designed to maintain a constant tension on the GPU cable 22 by means of a spring or hydraulic motor. The tension can be relieved during the process of extending the GPU cable 22 and connecting it to the intermediate cable 26, and then reapplied prior to the clamping operation. In operation, before the tractor 10 approaches the nose landing gear 12, the GPU cable 22 is extended from the reel 64 and connected to the intermediate cable 26. The reel 64 is then released and allowed to apply tension to the GPU cable 22 and the intermediate cable 26 in order to maintain the cables above the tractor 10 as the tractor approaches and clamps onto the nose landing gear 12. The reel 64 thus allows the GPU cable 22 to be extended a sufficient amount to enable it to be connected to the desirably short intermediate cable 26 before the tractor 10 surrounds the nose landing gear 12.

Figure 12:
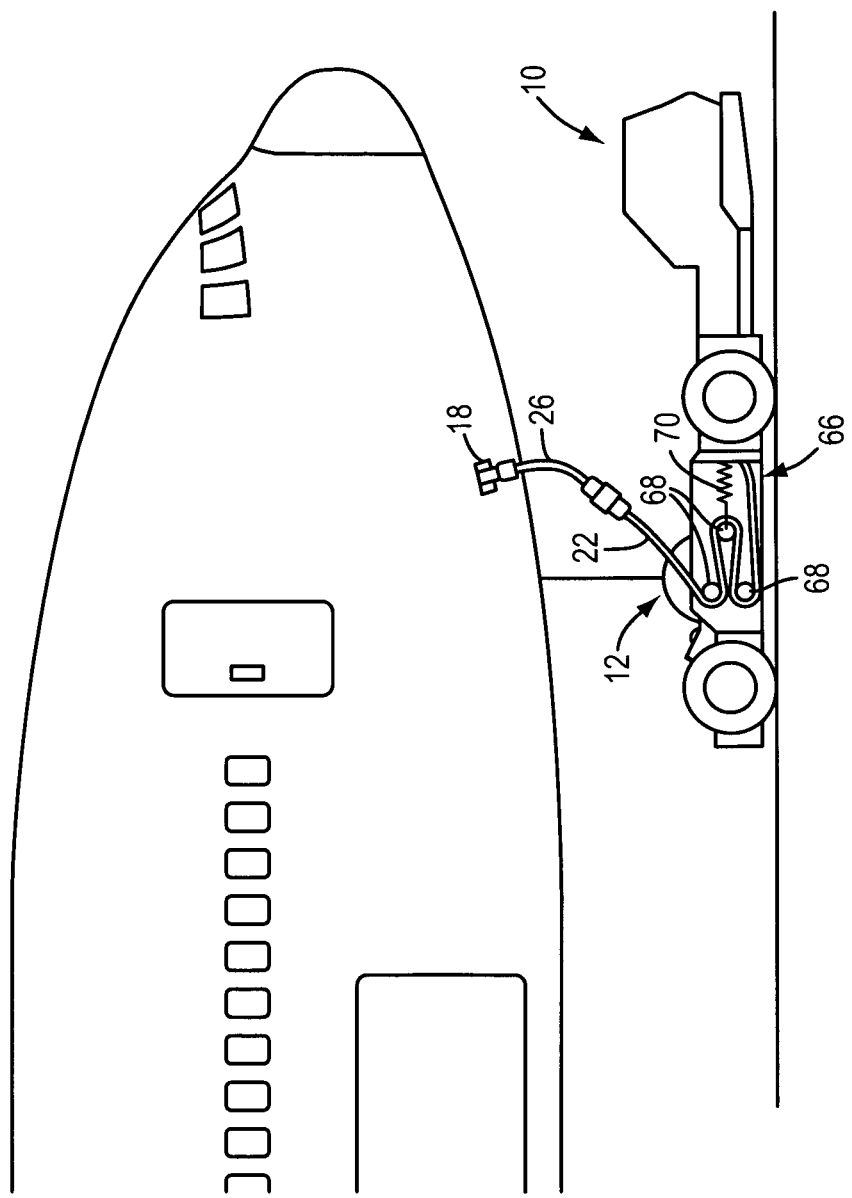
FIG. 12 is a side elevation view of an embodiment of the present invention in which a towbarless tractor is provided with a tensioning device around which the GPU cable is routed.

In a variation of this embodiment, which is shown in FIG. 12, tension for the GPU cable 22 is provided by a tensioning device 66. In this embodiment, the GPU cable 22 is routed over a number of pulleys 68, one of which is connected to a retractable cable reel 70 (which is shown schematically as a linear spring). The operation of the tensioning device 66 is similar to the operation of the retractable cable reel 64 described above. The tensioning device 66 thus allows the GPU cable 22 to be extended a sufficient amount to enable it to be connected to the desirably short intermediate cable 26 before the tractor 10 surrounds the nose landing gear 12.

Figure 13:
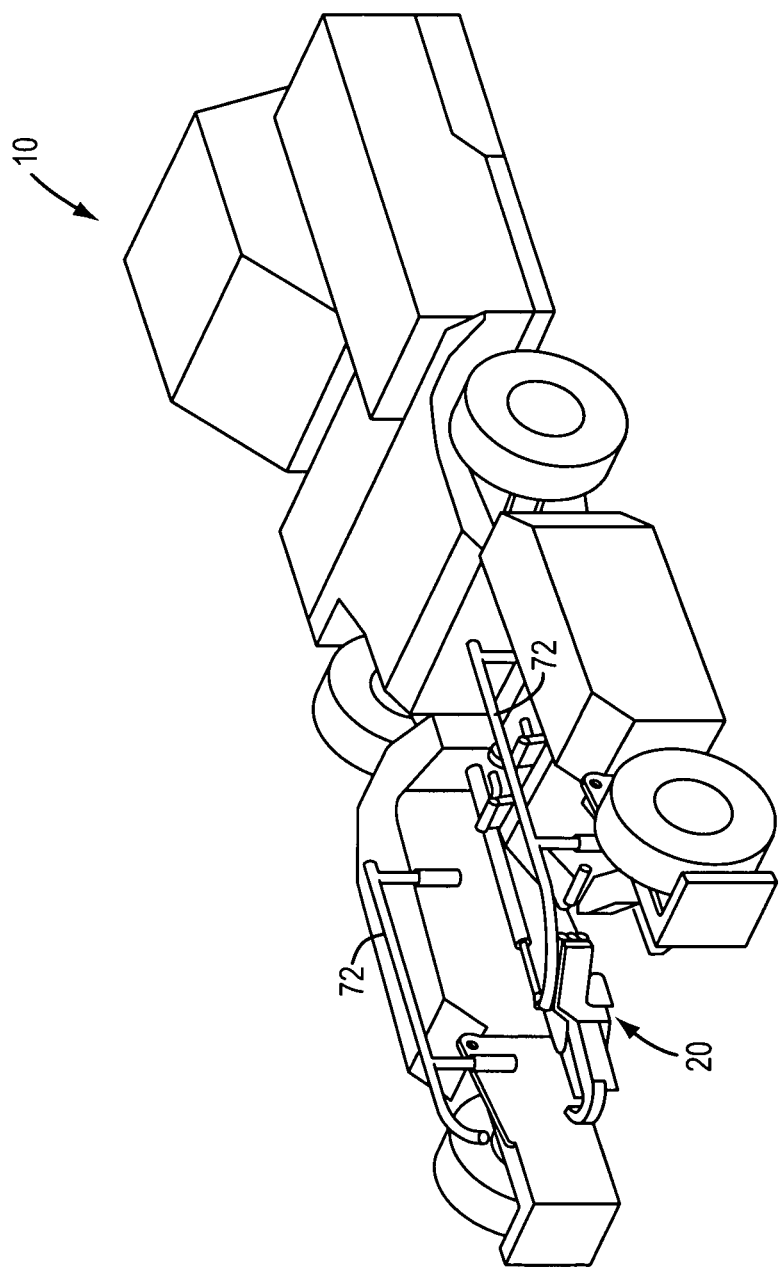
FIG. 13 is a perspective view of an embodiment of the present invention in which a towbarless tractor is provided with guide rails for guiding the free end of the intermediate cable away from the wheels and the clamping mechanism of the tractor as it approaches the nose landing gear of the aircraft.

In accordance with another embodiment of the invention which is shown in FIG. 13, the tractor 10 is provided with means independent of the intermediate cable 26 and the GPU cable 22 for guiding the free end of the intermediate cable, or for guiding a conventional GPU cable (not shown), away from the clamping mechanism 20 and the wheels of the tractor as the tractor approaches the nose landing gear 12. As shown in FIG. 13, such means may include a pair of guide rails 72 which are each connected to a corresponding leg of the U-shaped frame of the tractor 10. The guide rails 72 may be adjustable connected to the frame by suitable means so that they can be adjusted to ensure that they clear the aircraft fuselage and the components of the nose landing gear as the tractor is moved into position for the clamping operation.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. In combination with an aircraft towing vehicle which comprises a vehicle-mounted ground power unit (GPU), the GPU including a GPU cable having a first end which is connected to the GPU and a second end which comprises a GPU connector that is configured to be plugged into a GPU receptacle on an aircraft to be towed, the improvement comprising a GPU connection apparatus which includes:
   an intermediate cable having a first end which comprises a cable plug and a second end which comprises a cable receptacle;
   the cable plug being configured to be plugged into the GPU receptacle; and
   the cable receptacle being configured to receive the GPU connector;
   wherein in use of the GPU connection apparatus the cable plug is plugged into the GPU receptacle and the GPU connector is plugged into the cable receptacle to thereby electrically connect the aircraft to the GPU.

2. The improvement of claim 1, wherein the intermediate cable has a length which is less than the height of the GPU receptacle relative to a ground surface on which the aircraft is supported.

3. The improvement of claim 1, further comprising an extension pole having a first end which is connected to the cable plug; wherein the extension pole may be used by an operator to facilitate plugging the cable plug into the GPU receptacle.

4. The improvement of claim 3, wherein the extension pole is removably connected to the cable plug so that the extension pole may be removed from the cable plug after the cable plug is plugged into the GPU receptacle.

5. The improvement of claim 3, wherein the extension pole includes a second end and a handle which is connected to or formed integrally with the second end.

6. The improvement of claim 5, wherein the handle is configured as a hook which may be used to engage and position the intermediate cable after the cable plug is plugged into the GPU receptacle.

7. The improvement of claim 1, further comprising an extendable length limiting member which is connected between the GPU receptacle and the cable receptacle, the length limiting member comprising a first length when at rest which is less than the length of the intermediate cable to thereby effectively shorten the intermediate cable and a second length when extended which is approximately the same as the length of the intermediate cable to thereby enable the intermediate cable to be extended from the GPU receptacle.

8. The improvement of claim 7, wherein the length limiting member comprises an elastic cable which is connected between the GPU receptacle and the cable receptacle.

9. The improvement of claim 7, wherein the length limiting member comprises a retractable cable reel which includes a retractable first cable that is connected to one of the GPU receptacle and the cable receptacle.

10. The improvement of claim 9, wherein the cable reel includes a second cable which is connected between the cable reel and the other of the GPU receptacle and the cable receptacle.

11. The improvement of claim 1, further comprising at least a second GPU cable which is connected to the GPU and which includes a second GPU connector that is configured to be plugged into the cable receptacle, the second GPU cable being spaced apart from the first GPU cable on the aircraft towing vehicle.

12. The improvement of claim 1, further comprising at least a second GPU connector which is mounted to the aircraft towing vehicle, the second GPU connector being connected to the GPU and configured to be plugged into the cable receptacle.

13. The improvement of claim 1, further comprising a retractable cable reel which is supported on the aircraft towing vehicle and around which the GPU cable is wound to thereby effectively shorten the length of the GPU cable as the aircraft towing vehicle moves toward the aircraft.

14. The improvement of claim 1, further comprising a number of pulleys which are supported on the aircraft towing vehicle and over which the GPU cable is trained, at least one of the pulleys being moveable relative to the other pulleys to thereby effectively shorten the length of the GPU cable as the aircraft towing vehicle moves toward the aircraft.

15. The improvement of claim 14, further comprising a retractable member which is connected between the aircraft towing vehicle and the moveable pulley.

16. The improvement of claim 15, wherein the retractable member comprises a retractable cable reel.

17. The improvement of claim 1, further comprising at least a second intermediate cable; wherein the first intermediate cable can be connected to the GPU receptacle and the second intermediate cable can be connected between the first intermediate cable and the GPU connector to thereby electrically connect the aircraft to the GPU.

18. A method for connecting a ground power unit (GPU) mounted on an aircraft towing vehicle to a GPU receptacle located on an aircraft to be towed, the GPU comprising a GPU cable having a first end which is connected to the GPU and a second end which comprises a GPU connector that is configured to be plugged into the GPU receptacle, the method comprising:

providing an intermediate cable having a first end which comprises a cable plug and a second end which comprises a cable receptacle, the cable plug being configured to be plugged into the GPU receptacle and the cable receptacle being configured to receive the GPU connector;

prior to moving the aircraft towing vehicle into engagement with the aircraft, connecting the intermediate cable to the GPU receptacle; then moving the aircraft towing vehicle into engagement with the aircraft; and then connecting the intermediate cable to the GPU connector.

\* \* \* \* \*

UNITED STATES PATENT AND TRADEMARK OFFICE
CERTIFICATE OF CORRECTION

| | | |
|---|---|---|
| PATENT NO. | : 8,840,405 B2 | Page 1 of 1 |
| APPLICATION NO. | : 13/136642 | |
| DATED | : September 23, 2014 | |
| INVENTOR(S) | : L. Thomas | |

It is certified that error appears in the above-identified patent and that said Letters Patent is hereby corrected as shown below:

Title Page, Item (60)
Related U.S. "August 11, 2011" should read
Application
    Data    --August 11, 2010--

In the Specification
Column 1, line 6, "2011" should read --2010--

Signed and Sealed this
Fifteenth Day of March, 2016

Michelle K. Lee
*Director of the United States Patent and Trademark Office*